United States Patent [19]
Kawahara et al.

[11] Patent Number: 5,563,978
[45] Date of Patent: Oct. 8, 1996

[54] SLEEVE HOLDER FOR OPTICAL CONNECTOR

[75] Inventors: Akira Kawahara; Yuji Shinagawa, both of Tokyo; Shin'ichi Iwano, Mito; Kazunori Kanayama, Tokyo; Yasuhiro Ando, Houya; Toshiaki Nakano; Hiromasa Okamura, both of Tokyo, all of Japan

[73] Assignees: Sanwa Denki Kogyo Company Limited; Nippon Telegraph and Telphon Corporation; Honda Tsushin Kogyo Company Limited, all of Tokyo, Japan

[21] Appl. No.: 262,188

[22] Filed: Jun. 20, 1994

[30] Foreign Application Priority Data

Jun. 18, 1993 [JP] Japan ................. 5-172359

[51] Int. Cl.$^6$ ................................ G02B 6/36
[52] U.S. Cl. .......................... 385/136; 385/66
[58] Field of Search ................ 385/25, 60, 66, 385/136, 84, 90, 139, 140

[56] References Cited

FOREIGN PATENT DOCUMENTS

| 125525 | 11/1984 | European Pat. Off. | 385/60 |
| 3436634 | 4/1986 | Germany | 385/66 |
| 55-65915 | 5/1980 | Japan | 385/66 |

*Primary Examiner*—John Ngo
*Attorney, Agent, or Firm*—Lowe, Price, LeBlanc & Becker

[57] ABSTRACT

The sleeve holder for an optical connector capable of preventing slip-off or disconnecting of the sleeve holder from a housing and eliminating breaking of a split sleeve due to the increase of an insertion force of the ferrule by maintaining always no-load state for engaging pieces. A tube-shaped main body inserted and held in the housing is mounted therein with a slider slidable in an axis direction. A split sleeve inserting and holding the ferrule is mounted at the insides of a tube body and the slider fixedly engaged coaxially with the main body, and such mount of the split sleeve together with the slider is slidable by a predetermined stroke in the axis direction.

2 Claims, 5 Drawing Sheets

SLEEVE HOLDER FOR OPTICAL CONNECTOR

BACKGROUND OF THE INVENTION

I. Field of the Invention

This invention relates to sleeve holders for optical connectors of so-called plug-in type mounted to. devices by plug-in connection.

II. Description of the Prior Art

The conventional sleeve holder for the optical connector "a", as shown in FIG. 4(A), comprises, a tube-shaped main body "e" in which two engaging flanges "b" and "c" having a predetermined interval "1" in an axis direction with each other are provided in a protruding manner on an outer circumference of one-end of the tube-shaped main body "e", a tube body "f" which fits coaxially on the one-end of the main body "e", and a split sleeve "g" which is mounted on an inside of the tube body "f".

Symbols "h" and "i" depict engaging protrusions provided on an inside surface of an opening between the main body "e" and the tube body "f", thereby the split sleeve "g" is prevented from being disconnected from the sleeve holder "a".

In the optical connector incorporated with the sleeve holder "a" in FIG. 5, the sleeve holder "a" provided therein with the split sleeve "g" is inserted and held at a tip end of a PA housing "j" (housing on a package-side) fixed on the package, while a plug "m" provided with a ferrule "k" forced from its backside end by a spring "n" is inserted into the PA housing "j" from the rear-side, and the ferrule "k" is inserted and held in the split sleeve "g" within the sleeve holder "a".

A holding mechanism by the PA housing "j" and the sleeve holder "a" is as shown by two point chain lines fin FIG. 4 in that engaging pieces "p" protruding on the inside surface on the tip end of the PA housing "j" are separated upper and lower respectively against their sleeve forces, and after the spring holder "a" is inserted, the engaging pieces "p" are inserted and held between the engaging flanges "b" and "c" of the sleeve holder "a" by restoring forces of the engaging pieces "p".

A pressing force of the spring "n" (for example, 7.8N to 11.8N, in accordance with JIS (JAPANESE INDUSTRIAL STANDARDS) C 5971, Item 6, No. 7) is set so that such force is not applied to the PA housing "j" but is greater than the ferrule holding force (for example, 2.9 N to 6.9N, in accordance with JIS C 5971, Item 6, No. 6) of the split sleeve "g".

By this setting, the sleeve "g" of the ferrule "k" comes to have a length of $L_1$ (for simplification of the explanation, this includes a length "1" of the edge inside the opening) as shown in FIG. 5(A) when the ferrule "k" is inserted into the split sleeve "g".

The ferrule holding force of the split sleeve "g" is lower than the ferrule pressing force due to the spring "n" of the plug "m", accordingly even if a ferrule "K'" incorporated in the other plug "m'" in FIG. 5(A) is inserted into a position in FIG. 5(B) from the other-side end of the sleeve holder "a", then in this stage, positions of the sleeve holder "a", split sleeve "g", and ferrule "k" are not varied, the condition in FIG. 5(A) therefore remains as it is.

When a sufficient pressing force is generated between the ferrules by pressing the other-side plug "m'" and by butting the ferrules against each other, that is, when setting it to an optical reference position, in other words when the ferrule "k'" is inserted onto the position shown in FIG. 5(C), then the ferrule "k" moves back by "$1_2$" relative to the split sleeve "g" because the sleeve holder "a" is held by the engaging piece "p" of the PA housing "j". Therefore, the sleeve "g" of the ferrule "k" comes to have a length of $L_1'$ ($=L_1-1_2$) as shown in FIG. 5(C).

"$1_2$" and "$1_2'$", which are formed at a ferrule "k'"-side, depend on characteristics of the springs pressing the respective ferrules, however, those have in general the same extent of sizes.

That is, the ferrules "k" and "k'" are in contact with each other by being pressed by the springs "n" and "n'" having the same extent of resilient forces.

When the ferrule "k'" is pulled out by pulling out the other-side plug "m'" as in FIG. 5(D), then the one-side ferrule "k", which is pressed and energized forward by a resilient force of the spring "n", intends to return to the position where it existed before the other-side ferrule "k'" was inserted, or to the condition shown in FIG. 5(A).

Simultaneously, the ferrule "k" is forced back to the left by 12 in the drawing by the spring "n" against the ferrule holding force of the split sleeve. The split sleeve "g" and the sleeve holder "a" are pressed by a force corresponding to the ferrule holding force, thus, the ferrule "k" returns to the position $L_1$ under the condition that the pressing force corresponding to the ferrule holding force just remains against to the split sleeve "g" and the sleeve holder "a" as shown in FIG. 5 (D). That is, the sleeve holder "a" comes to the condition that, by its engaging flange "c", the engaging pieces "p" of the PA housing "j" is pressed by a force corresponding to the ferrule holding force or by the force of 2.9N to 6.9N according to the reference as formerly described.

As described above, in the conventional sleeve holder, once the other-side ferrule "k'" is pulled out, since the pressing force of the sleeve holder "a" acts on the engaging pieces "p" of the PA housing "j", the engaging pieces "p" are separated upper and lower each other against their resilient forces. Consequently, in the prior art the sleeve holder "a" slipped off to contact with the other-side ferrule "k'"-side, or the engaging pieces "p" were disconnected from the housing, or the engaging pieces "p" of the PA housing "j" were broken.

In the above condition, the sleeve holder or sleeve itself is semifixed on the engaging pieces "p" by the force corresponding to the ferrule holding force. Hence, when the other-side plug "m'" incorporated with the ferrule k' is inserted again, and in the case where a positional displacement from the axis is generated, a receiving port of the ferrule of the sleeve holder "a" can not follow it satisfactorily and does produce galling or the like, this therefore tends to mechanically break the sleeve "g".

In particular, such trouble comes great when it is applied to a multi-centered construction.

The present invention has been made for solving the problem in the prior art. An object of the invention is to provide a sleeve holder for an optical connector capable of facilitating the plug insertion, preventing slip-off of a sleeve holder, the increase of a required insertion force, and breaking of a split sleeve, and making it durable for its repeated use in a long time period, by way that a condition where a pressing force of the sleeve holder always does not act on the engaging pieces of the PA housing is kept even in repeating a predetermined operation through insertion or pull-out of a plug.

SUMMARY OF THE INVENTION

To achieve the object as hereinbefore described, a sleeve holder for an optical connector according to the present invention is characterized in that; a tube-shaped main body inserted and held in a housing is mounted therein in the state where a tube-shaped slider can slide in an axis direction, a split sleeve inserting and holding a ferrule is mounted insides of the slider and a tube body fixedly engaged coaxially with the main body, in such a way that the split sleeve together with the slider being slidable by a predetermined stroke in the axis direction.

The plug incorporated with the ferrule and the sleeve holder are inserted into the housing under the condition that the slider is placed on a back position.

At this time, the ferrule is being inserted up to a predetermined position in respect to the split sleeve of the sleeve holder.

The ferrule holding force of the split sleeve is lower than a pressing force due to the spring of the ferrule, thus even if the other plug incorporated with the ferrule is inserted from the other-side end of the sleeve holder, each positional state of the parts is not varied until said ferrule is inserted up to the position of the already inserted ferrule.

The ferrule in the other plug butts to an optical reference position, or to a tip end of the already inserted ferrule, thus the ferrule is inserted into a position where both tip ends of the ferrules receive a pressing force each other.

Here, $L_3$ is set larger than a value of $L_1-L_2$, where $L_1$ represents an insertion length of the already inserted ferrule, $L_2$ an insertion length of the already inserted ferrule at the time that the other ferrule is inserted up to an optical reference position, and $L_3$ a slide stroke of the slider in the sleeve holder. $L_1$ and $L_2$ include $l_3$ which is the length of the internal edge of the opening of the sleeve holder as is the case described above.

Even when the other ferrule is inserted in up to the optical reference position, in respect to the sleeve holder, the already inserted ferrule moves back in a unitary manner, with the split sleeve and the slider by $L_1-L_2$ (* $l_2$). Accordingly, a positional relationship ($L_1$) of the already inserted ferrule in respect to the split sleeve is not varied.

When the other ferrule is pulled out, the already inserted ferrule is pushed out forwardly together with the split sleeve by the pressing force due to the spring. The slider, sleeve and already inserted ferrule are moved back in unitary manner, and there does not generate a phenomenon such that the sleeve holder and the sleeve are pressed by the force corresponding to the ferrule holding force as in the conventional example. Therefore, this enables, without problem, returning to the position where previously the other ferrule has inserted.

Even when the other plug incorporated with the ferrule is inserted again, the operation in the above is repeated, thus the sleeve holder is always maintained at an initial state without receiving a load from spring due to the ferrule movement.

BRIEF DESCRIPTION OF THE DRAWINGS

FIG. 1(A) shows a state where the slider 4 is pulled in, and FIG. 1(B) shows a state where the slider 4 is pulled out;

FIG. 2(A) shows a state where the sleeve holder and the first plug are inserted and held in the PA housing, FIG. 2(B) shows a state where a ferrule of the second plug is inserted into an other-side receiving port of the sleeve holder in the state shown in FIG. 2(A), FIG. 2(C) shows a state where the ferrule of the second plug is inserted into a split sleeve of the sleeve holder up to an optical reference position, and FIG. 2(D) shows a state where the ferrule of the second plug is pulled out from the sleeve holder;

FIG. 4(A) shows the sleeve holder, and FIG. 4(B) shows a state where the first plug is inserted into the PA housing.

FIG. 5(A) shows a state before the second plug is inserted in respect to the sleeve holder, FIG. 5(B) shows a state where the ferrule of the second plug is inserted into the other receiving port of the sleeve holder, FIG. 5(C) shows a state where the ferrule of the second plug is inserted into the split sleeve of the sleeve holder, and FIG. 5(D) shows a state where the second plug is pulled out from the sleeve holder.

DETAILED DESCRIPTION OF THE PREFERRED EMBODIMENT

Figure 1A:
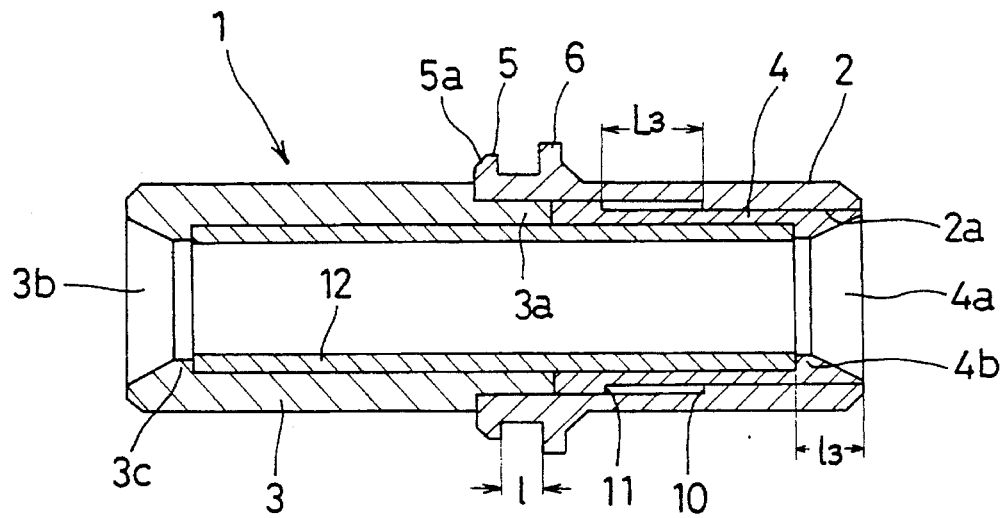
FIGS. 1(A) and 1(B) are vertical sectional views showing an embodiment of a sleeve holder for an optical connector according to the present invention, where

One embodiment of the invention will be shown and described referring to the drawings.

Figure 1B:
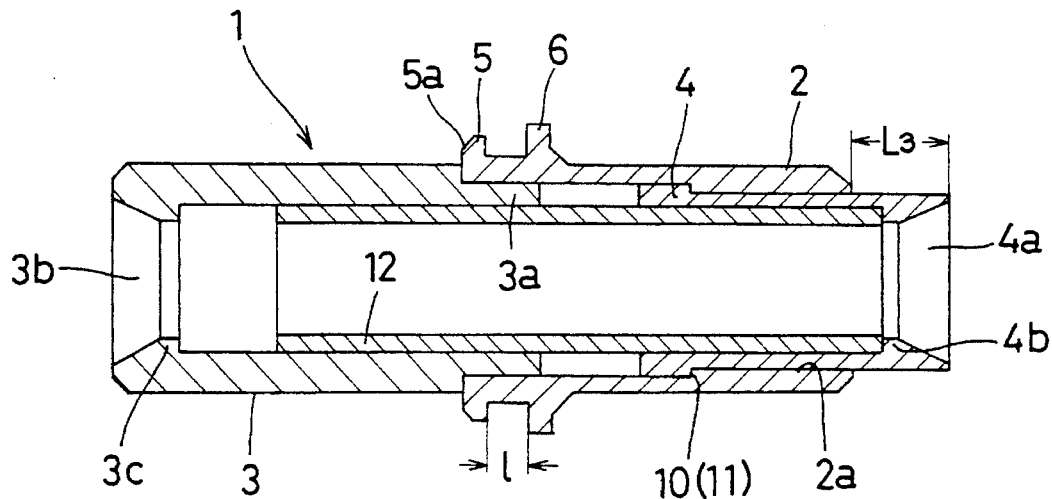
Figure 2A:
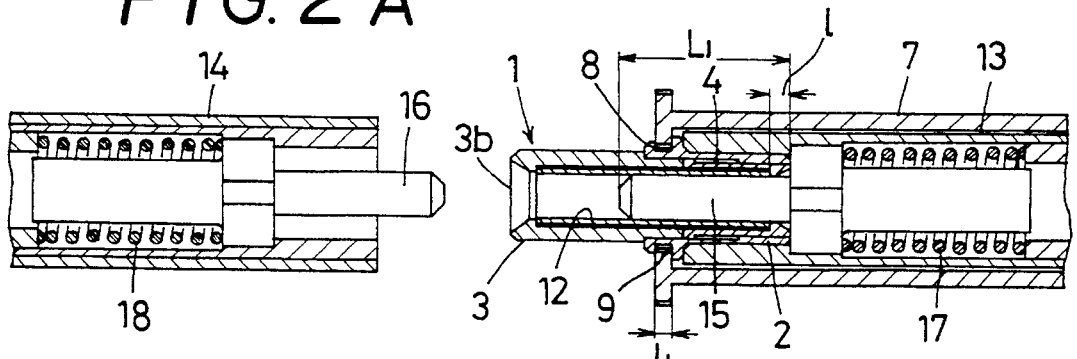
FIGS. 2(A), 2(B), 2(C) and 2(D) are vertical sectional views of a PA housing, a sleeve holder, a first plug, and a second plug, where

FIG. 1 is a vertical sectional view of a sleeve holder, and FIG. 2(A), (B), (C), and (D) are vertical sectional views at the positional state of each of the parts when a second plug is inserted into and pulled out from the sleeve holder in the state where a first plug and a sleeve holder are inserted and held into a PA housing.

In FIG. 1 and FIG. 2(A) to (D), a sleeve holder 1 comprises a tube-shaped main body 2, a tube body 3 having the substantially same diameter as the main body 2, and a slider 4.

In the main body 2, two engaging protrusions 5 and 6 are provided protrudingly on an outer circumference on one-side end of the main body by putting a predetermined interval of "1" in an axis direction, the engaging protrusion 5 positioned on its outside sets its outer diameter and makes its front surface as a tilted surface 5a so that it is able to fit by force in to an insertion hole 8 of a PA housing 7 and also it is able to engage on an engaging piece 9 protruded on an inside surface of an opening of the insertion hole 8.

In the engaging protrusion 6 positioned inside, its outer diameter is set larger than that of the engaging protrusion 5, thereby it can be engaged with the engaging piece 9 of the inside surface of the opening of the insertion hole 8, and it is prevented from the slipping-out to out side.

The engaging protrusions 5 and 6 have the interval of "1", which is set to a value substantially equal to its plate thickness of "$1_1$" so that the insertion hole 8 of the PA housing 7 can be engaged with the engaging piece 9 in the inside surface without clearance.

In the main body 2, by forming the inside diameter of its other end-side smaller than that of one end-side, an engaging portion 10 is provided on the inner circumference.

The slider 4, is formed in a tube shape having the outer diameter corresponding to the inner diameter of the other end-side of the main body 2, and is mounted slidably in an axis direction on the inside of the main body 2 so that a tip end thereof goes in and out from or into an opening 2a of the other end of the main body 2.

A rear end portion positioned inside the main body 2 of the slider 4, has the outer diameter corresponding to the inner diameter of the one end-side of the main body 2, and is formed larger than the outer diameter of its tip end-side, thereby an engaging portion 11 engaging with the engaging portion 10 of the main body 2 in the axis direction of each other is provided on its circumference.

In the tube body 3, its outer diameter is formed substantially equal to that of the main body 2, one end thereof is provided protrudingly with an engaging tube portion 3a having a smaller diameter in an axis direction in a unitary body, and the main body 2 and the tube body 3 are fixed coaxially in a unitary body by engaging the engaging tube portion 3a with one end of the main body 2.

The slider 4 is mounted on the inside surface of the main body 2 non-releasably by the tube body 3, its tip end is held in a plane with the other end of the main body 2 in a moved-back position shown by solid lines in FIG. 1, and it is made such that the slider 4 can slide from this moved-back position by a distance on which the engaging portions 10 and 11 are engaged mutually.

That is the slider 4 is set to slide by $L_3$ in the axis direction as shown in FIG. 1(B).

As a sleeve, a sleeve 12 made of zirconia or the like is mounted and fixed in the inside of the tube body 3 and the slider 4.

The engaging portions 3c and 4b are protrudingly provided on the inner ends of receiving ports 3b and 4a of a ferrule which, as described later, provided as a taper hole shape on the other end of the tube body 3 and the tip end of the slider 4, whereby the split sleeve 12 is prevented from slipping-off in the axis direction and held in a fixed state.

The one end of the split sleeve 12 is inserted into the main body 2 in the state where the slider 4 is being inserted. Then, the split sleeve 12 is fixed in the insides of the tube body 3 and the slider 4 by engaging and fixing the tube body 3 on the main body 2.

The ferrule holding force of the split sleeve 12 is set lower than a pressing force due to springs 17 and 18 of ferrules 15 arid 16 assembled in a first and second plugs 13 and 14 shown in FIG. 2(A) to (D).

The inner diameter of the slider 4 is made equivalent to the outer diameter of the split sleeve 12, and is set slightly smaller than the inner diameter of the tube body 3. For this reason, if the slider 4 is moved, the split sleeve 12 is moved by $L_3$ in the axis direction together with the slider 4.

According to the sleeve holder thus constructed, the ferrule 15 of the first plug 13 is inserted into the split sleeve 12 from the one-side of receiving port 4a of the sleeve holder 1, and in this state, further inserted into the PA housing 7, and still further engaged and held on the engaging piece 9 of the PA housing 7 at the engaging protrusions 5 and 6 of the sleeve holder 1 as shown in FIG. 2(A) by pushing by force the sleeve holder 1 into its insertion hole 8, and an insertion length of the ferrule 15 for the split sleeve 12 becomes equal to $L_1$. This is the same as the known sleeve holder.

Figure 2B:
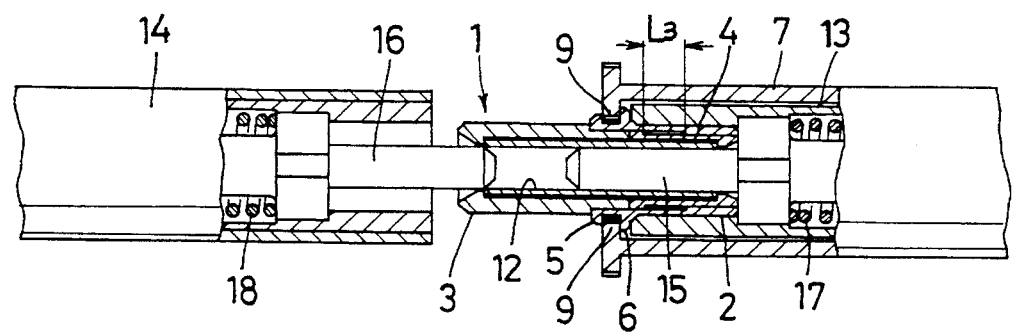

In FIG. 2(B), even inserting a part of the ferrule 16 of the second plug 14 into the other receiving port 3b of the sleeve holder 1, the ferrule holding force of the split sleeve 12 is lower than the pressing force due to the spring 17 of the ferrule 15, thus the positional relationship of each part is not varied and the same condition in FIG. 2(A) is maintained.

Figure 2C:
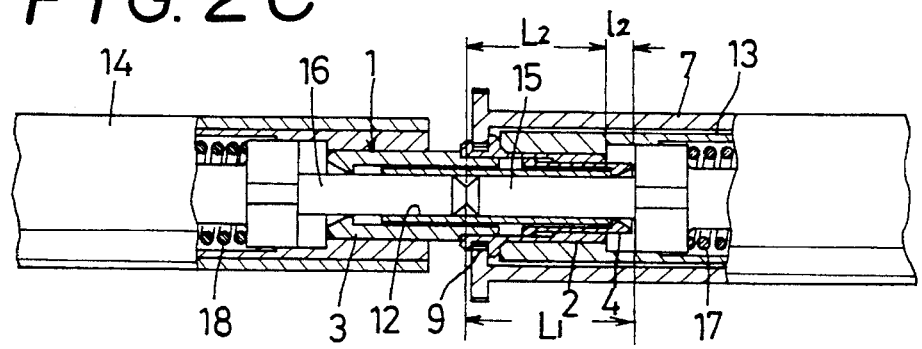

Further, when the ferrule 16 of the second plug 14 is inserted into the optical reference position as shown in FIG. 2(C), the split sleeve 12, slider 4, and ferrule 15 move back (to the right hand direction in the drawing) all together by $L_1-L_2$ ($=l_2$) because a slide stroke $L_3$ of the slider 4 is set with the positional relationship represented by $L_3>L_1-L_2$. At this time, position ($L_1$) where the ferrule 15 in the first plug 13 for the split sleeve 12 does not vary.

Said $L_1$ and $L_2$ are made as the values including a length 13 of the edge portion in the opening of the sleeve holder 1 as formerly described.

Figure 2D:
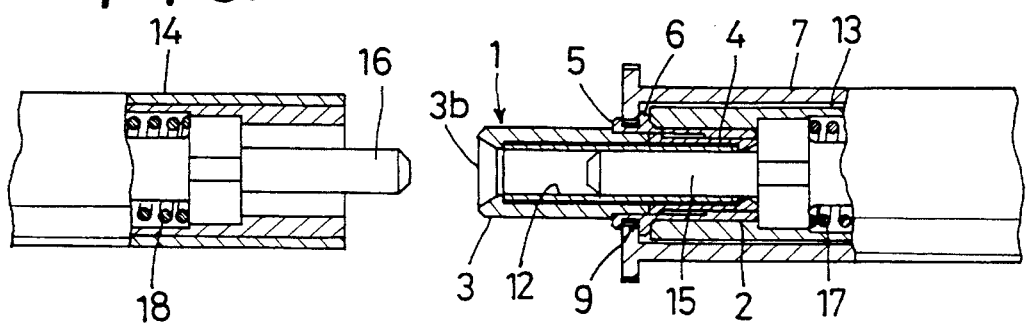

When the ferrule 16 of the second plug 14 is pulled out from the state in FIG. 2(C), the ferrule 15 of the first plug 13 is forced out by a pressing force due to the spring 17, so that the ferrule 15, split sleeve 12, and slider 4 are pressed all together to return to the position before the ferrule 16 is inserted as shown in FIG. 2(D), or to the same position as in FIG. 2(A).

Therefore, even when the ferrule 16 of the second plug 14 is inserted again, by repeating said operation, said sleeve holder 1 is kept always at the state where a pressing force is not applied to the engaging piece 9 of the PA housing 7.

Figure 3:
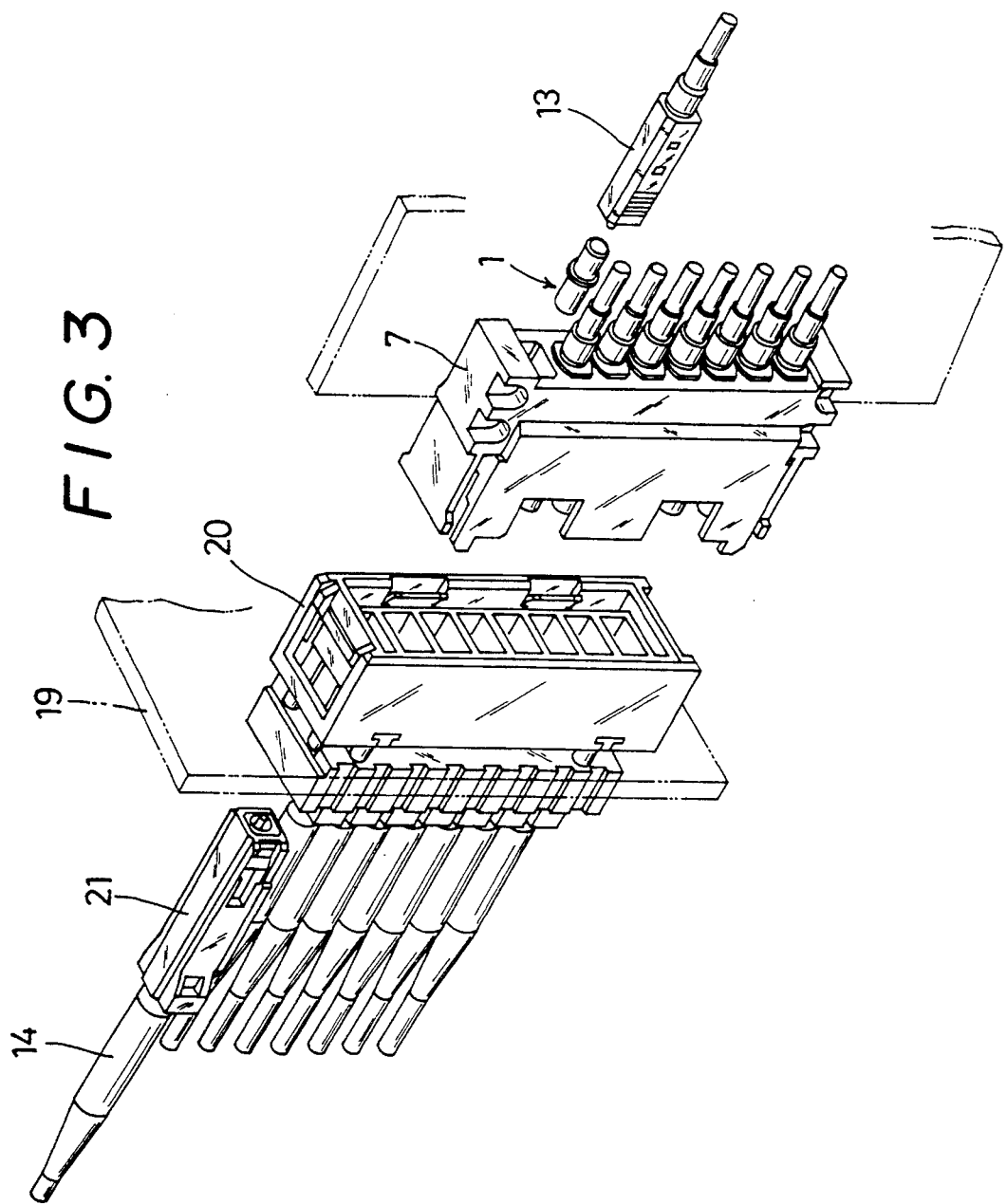
FIG. 3 is a perspective view showing a state of use of the sleeve holder described above.
Figure 4A:
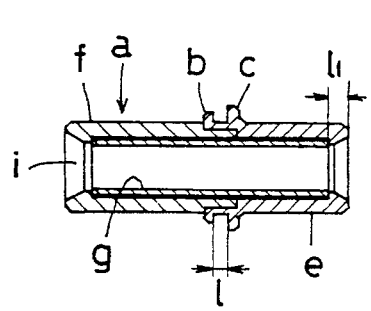
FIGS. 4(A) and 4(B) are vertical sectional views of the conventional sleeve holder for optical connector, PA housing, and first plug, where
Figure 4B:
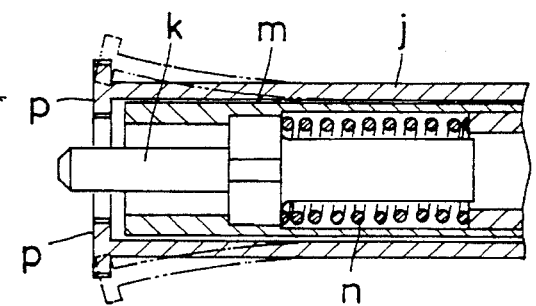
Figure 5A:
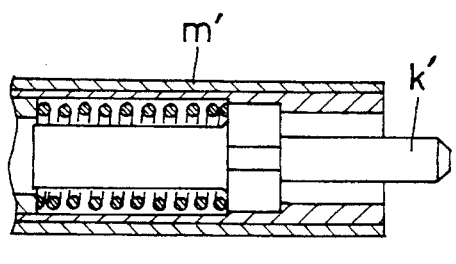
FIGS. 5(A), 5(B), 5(C) and 5(D) are vertical sectional views of the conventional sleeve holder for optical connectors, showing a state of inserting-in or pulling-out the second plug in respect to the sleeve holder inserted into the PA housing together with the first plug, where
Figure 5A:
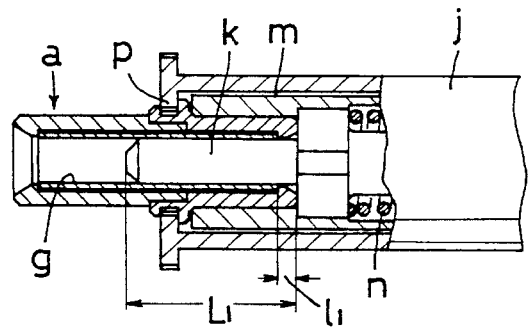
Figure 5B:
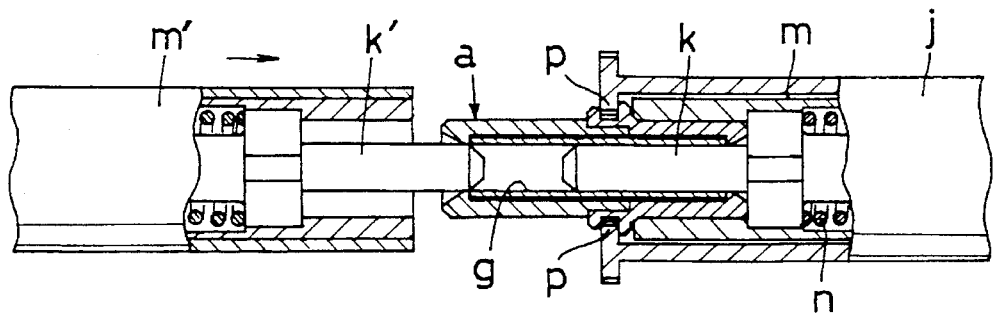
Figure 5C:
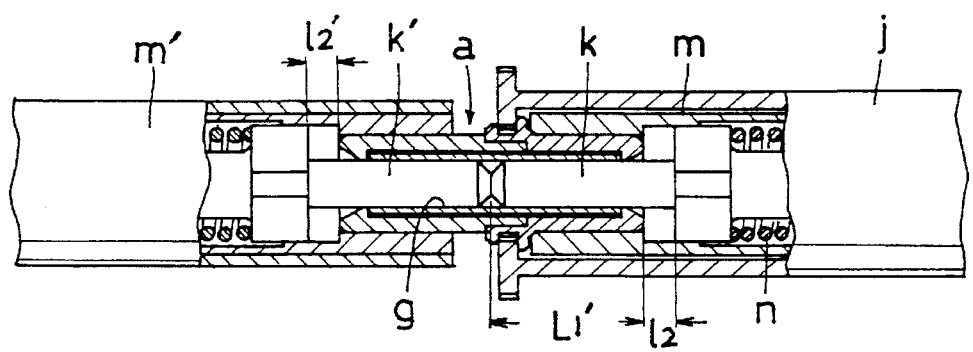
Figure 5D:
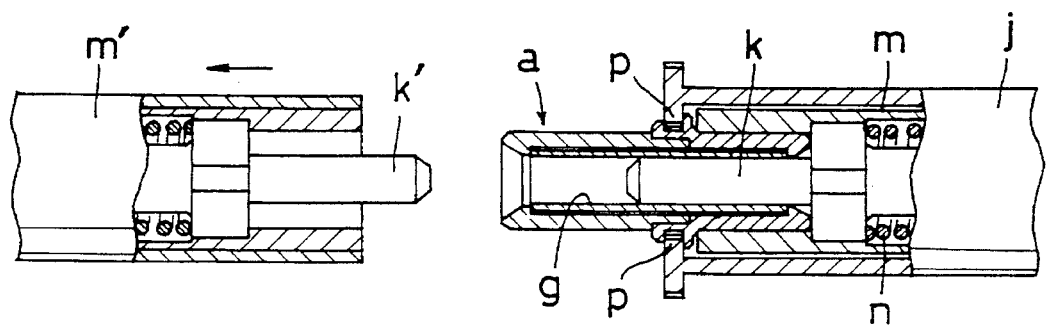

FIG. 3 shows a state of using a sleeve holder of the invention for an optical connector for realizing high density, where 19 depicts a back panel, 20 a housing at the back panel-side, and 21 a back panel plug.

Because the present invention is constituted as explained above, a slip-off of the sleeve holder and disconnecting of the engaging pieces from the PA housing are securely prevented because a condition always free from the pressing force on the engaging pieces for the PA housing is kept by repeating operation of the respective parts even in inserting again the ferrule of the other plug, in addition to the fact that the positional relationship of inserting position for the split sleeve of the ferrule of one-side plug is not varied and returns to the position before the ferrule of the plug is inserted by pulling out the other plug, even when the ferrule of the other plug is inserted from the other-side receiving port to the sleeve holder which is inserted and held in the housing under the condition that the ferrule of one-side plug is inserted into the split sleeve. Even when the ferrules in the both plugs are displaced from an optical axis, there can be prevented breaking of the split sleeve accompanying with the increase of an insertion force of the ferrule by the fact that the ferrule receiving port can be followed satisfactorily.

What is claimed is:

1. A sleeve holder for axially connecting cylindrical ferrules dressing optical fibers in an optical connector, comprising:

a split sleeve;

a slider; and holder shells;

said split sleeve being substantially cylindrical and having an inner diameter nearly equal to an outer diameter of the ferrules;

said slider being substantially cylindrical and having a central portion, a tip end and a rear end;

said tip end of said slider having a ferrule receiving port, including therein an inwardly protruding internal protrusion having an inner diameter smaller than an outer diameter of said split sleeve thereby to engage said split sleeve;

said rear end of said slider having an outwardly protruding external protrusion;

said holder shells being substantially cylindrical and including a pair of outwardly protruding engaging protrusions before and behind a predetermined position on a circumference thereof;

said holder shells having an inner diameter larger than the outer diameter of said split sleeve;

a second ferrule receiving port being mounted at a tip portion of said holder shells on an opposite side of the ferrule receiving port of said slider;

said second ferrule receiving port comprising an inwardly protruding protrusion having an inner diameter smaller than the outer diameter of said split sleeve;

an inner surface of said holder shells leading to said second ferrule receiving port being substantially cylindrical and having an inner diameter nearly equal to an inner diameter of said slider;

a rear end side of said holder shells being substantially cylindrical and having a first portion having an inner diameter larger than a diameter of the outwardly protruding external protrusion at the rear end of said slider, and a second portion having an inner diameter smaller than the diameter of the outwardly protruding external protrusion of said slider;

the rear end of said slider being positioned inside of the rear end of said holder shells.

2. A sleeve holder for an optical connector as claimed in claim 1, wherein:

said holder shells comprise a main body and a tube body;

said main body being a tube-shaped main body having said pair of outwardly protruding engaging protrusions before and behind a predetermined position at the rear end thereof for engaging with engaging pieces of a housing;

said tube body forming said sleeve holder together with said main body by fixedly engaging inside a rear end of said main body;

said slider being a tube-shaped slider wherein said outwardly protruding external protrusion comprise engaging portions on the circumference of the rear portion thereof, for engaging said main body and being slidably mounted coaxially within said main body so as not to be separated therefrom, said main body including inwardly protruding engaging means comprising said second portion at the rear end side of said holder shells with an inner diameter smaller than the diameter of the outwardly protruding external protrusion of said slider, said outwardly protruding external protrusion forming said engaging portions of said slider and said inwardly protruding engaging means of said main body engaging with each other for stopping sliding of said slider;

said split sleeve being restrained by said inwardly protruding internal protrusion at the ferrule receiving port at the tip end of said slider and by said inwardly protruding protrusion at said second ferrule receiving port so as to be slidable coaxially with said slider within said holder shells and not to be separated therefrom;

said slider and said split sleeve are constructed to be placed at a back position relative to said main body and said tube body when a ferrule is inserted therein by a predetermined length from one end of said sleeve holder, while moving forward by predetermined strokes together with said already inserted ferrule when another ferrule is inserted therein from the other end of said sleeve holder up to an optical reference position to press against the already inserted ferrule; and said main body having dimensions selected for setting backward and forward movements of said slider and said split sleeve as slide strokes of lengths equal to or larger than a value obtained by subtracting an inserting length of the already inserted ferrule at a forward position thereof, at a time when the other ferrule is inserted up to the optical reference position, from an inserting length of the already inserted ferrule at a back position thereof with respect to said sleeve holder.

* * * * *